United States Patent [19]

Miyamoto et al.

[11] Patent Number: 5,399,225
[45] Date of Patent: Mar. 21, 1995

[54] TIRE BUILDING APPARATUS INCLUDING TWO BELT DRUMS

[75] Inventors: Yoshinori Miyamoto; Hidemasa Sato; Jiro Agawa, all of Nagasaki; Kazuo Mogi, Hiratsuka; Toru Aihara, Hiratsuka; Keizo Yamashita, Hiratsuka, all of Japan

[73] Assignee: Mitsubishi Jukogyo Kabushiki Kaisha, Tokyo, Japan

[21] Appl. No.: 189,308

[22] PCT Filed: Jan. 31, 1994

[86] PCT No.: PCT/JP93/00729
§ 371 Date: Jan. 14, 1994
§ 102(e) Date: Jan. 14, 1994

[87] PCT Pub. No.: WO93/24310
PCT Pub. Date: Dec. 9, 1993

[30] Foreign Application Priority Data

Jun. 1, 1992 [JP] Japan .................. 4-140523

[51] Int. Cl.⁶ .................................. B29D 30/20
[52] U.S. Cl. ........................ 156/396; 156/111; 156/397; 156/406.2
[58] Field of Search .......... 156/396, 111, 406.2, 156/405.1, 397, 126, 127

[56] References Cited

U.S. PATENT DOCUMENTS 4,985,100  1/1991  Sasaki et al. ................... 156/111

FOREIGN PATENT DOCUMENTS 70548     4/1984  Japan .................. 156/396
62-33941  7/1987  Japan .
62-35381  8/1987  Japan .
2-107432  4/1990  Japan .

*Primary Examiner*—Geoffrey L. Knable
*Attorney, Agent, or Firm*—Arnold, White & Durkee

[57] ABSTRACT

In a tire building apparatus comprising a band drum 1, a shaping drum 2, and a belt forming machine 101 having two belt drums 3 which can be oscillated or cyclically moved, the band drum 1 and the belt forming machine 101 are disposed on the same axis in opposing relationship, the shaping drum 2 is disposed so that it can be reciprocated between the position on the aforesaid axis and the standby position while maintaining the parallel condition with respect to the aforesaid axis, and a band transfer 4 and a belt transfer 5 are disposed so that they can be reciprocated along the aforesaid axis between the band drum 1 and the belt forming machine 101.

2 Claims, 12 Drawing Sheets

FIG. 6

| POSITION A | POSITION B |
|---|---|
| OSCILLATION OF DRUM ||
| BONDING OF TREAD | WINDING OF JOINTLESS |
| REMOVAL OF BELT AND TREAD ASSEMBLY | |
| WINDING OF NO.1 BELT | |
| WINDING OF NO.2 BELT | WINDING OF TREAD |

FIG. 7

| POSITION A | POSITION B |
|---|---|
| OSCILLATION OF DRUM ||
| WINDING AND BONDING OF TREAD | WINDING OF JOINTLESS |
| REMOVAL OF BELT AND TREAD ASSEMBLY | |
| WINDING OF NO.1 BELT | |
| WINDING OF NO.2 BELT | |

FIG. 8(iii) 

FIG. 8(vii) 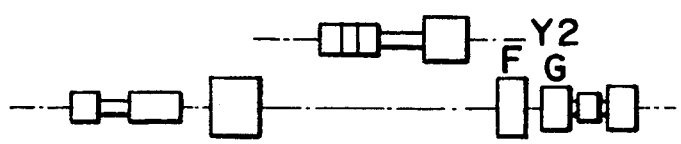

OPERATOR SIDE

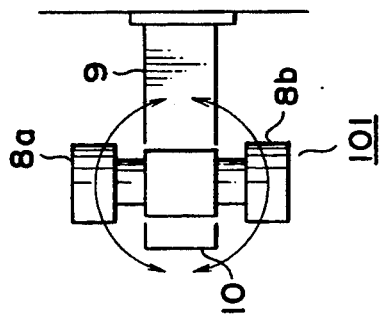
FIG. 10(b) (PRIOR ART)
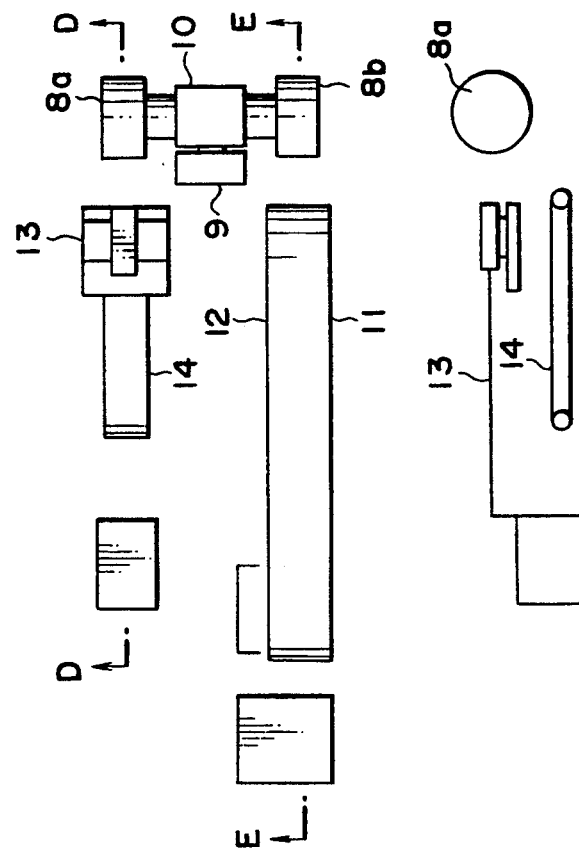
FIG. 10(a) (PRIOR ART)
FIG. 10(c) (PRIOR ART)
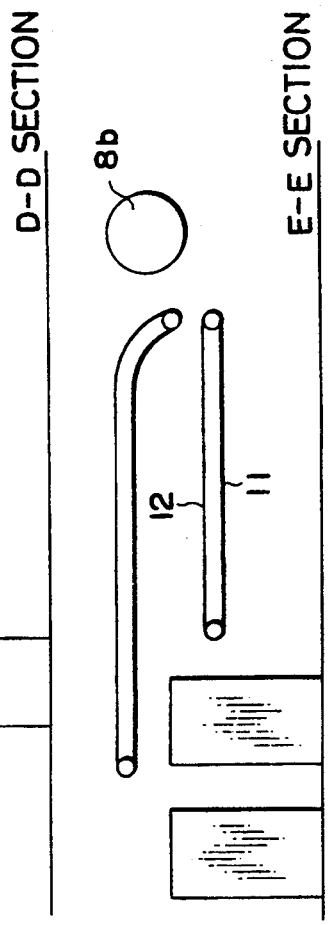
FIG. 10(d) (PRIOR ART)

TIRE BUILDING APPARATUS INCLUDING TWO BELT DRUMS

TECHNICAL FIELD

The present invention relates to a tire building apparatus.

BACKGROUND ART

A conventional tire building apparatus (disclosed in Japanese Patent Provisional Publication No. 2-107432 or No. 107432/1990 (Japanese Patent Application No. 63-259533 or No. 259533/1988)) will be described with reference to FIG. 9. In this figure, reference numeral 1 denotes a band drum, 2 denotes a shaping drum, and 3 denotes a belt drum. The number of these drums is one each. The tire building apparatus comprises the band drum 1, the shaping drum 2, and the belt drum 3.

A housing 7 supports the shaping drum 2 and the belt drum 3. The above three drums 1, 2 and 3 are arranged on the same axis. Between the band drum 1 and the shaping drum 2, a band transfer 4 is disposed in such a manner as to reciprocate along the aforesaid axis. Between the shaping drum 2 and the belt drum 3, a belt transfer 5 is disposed in such a manner as to reciprocate along the aforesaid axis. A tread servicer 6 is disposed on the operator side (front position).

The conventional tire building apparatus shown in FIG. 9 builds ordinary tires. Since the band drum (band forming drum) 1 is dedicated to assembling an inner liner, carcass, etc., the operation time for the band drum 1, the shaping drum 2, and the belt drum 3 is distributed and uniformed, thereby the tire building time for the whole tire building apparatus being shortened. Further, since the three drums 1, 2, and 3 are arranged on the same axis and the band transfer 4 and the belt transfer 5 reciprocate between these drums 1, 2, and 3 along the aforesaid axis, the band transfer 4 and the belt transfer 5 operate efficiently.

Recently, a demand for higher speed of tire building has increased, and there arisen a need for winding a narrow member with a width of about 10 mm, usually called jointless, endless, etc., on the upper layer of the breaker in a spiral form. This significantly increases the operation time on the belt drum 3; sometimes the operation time becomes about double the conventional time. When a tire is built on the tire building apparatus shown in FIG. 9, although the tire building time for the whole tire building apparatus is shortened by distributing and uniforming the operation time for the three drums 1, 2, and 3 as described above, the operation time for the belt drum 3 is increased, so that it has a problem that the tire building time for the entire tire building apparatus is approximately doubled.

On the other hand, each process of the tire building apparatus has been automated, so that one operator handles two tire building machines. For this reason, there has arisen a need for arranging two tire building apparatuses in opposing relationship by arranging the tread servicer 6 on the side opposite to the operator (rear position).

In order to wind jointless etc., the need for distribution of increased operation time on the belt drum 3 leads to the installation of two belt drums 3.

To wind materials in a sequence of, for example, No. 1 belt, No. 2 belt, cap strip, and tread, and to repeatedly perform the removing operation at the belt transfer 5, it is necessary that two belt drums 3 can be oscillated or cyclically moved.

In this case, however, it is impossible to mount the shaping drum 2 and the belt drum 3 to the same housing 7 as with the conventional tire building apparatus shown in FIG. 9. Two belt drums must be mounted to an independent housing as shown in FIG. 10.

In FIG. 10, two belt drums 8a and 8b are mounted to a housing 10 rotatably supported by a stand 9. The housing 10 is provided with a driving unit for driving each of the belt drums 8a and 8b. The housing 10 can be oscillated 180 degrees on the stand 9.

After a belt and tread assembly completed at the E—E line position in FIG. 10(a) and FIG. 10(d) is removed, No. 1 belt is wound around the belt drum 8b by means of a No. 1 belt servicer 11, and No. 2 belt is wound around the belt drum 8b by means of a No. 2 belt servicer 12. At the same time, at the D—D line position in FIG. 10(a) and FIG. 10(c), a jointless is wound around the belt drum 8a by means of a jointless servicer 13, and a tread is wound around the belt drum 8a by means of a tread servicer 14. Then, the belt drums 8a and 8b are rotated 180 degrees, and the above operations are repeated at each position.

FIGS. 11 through 13 show examples of conventional tire building apparatuses in which one operator can handle two belt forming machines 101 by adopting the above-described constitution.

In the tire building apparatus shown in FIG. 11, a band drum 1 and a shaping drum 2 are arranged on the same axis in opposing relationship, and a band transfer 4 is arranged between them so as to be movable in the X direction. A belt forming machine 101 is arranged on the aforesaid axis on the side opposite to the shaping drum 2 with respect to the housing 15.

Therefore, the belt transfer 5 must be moved over the housing 15 in the X-Z direction or X-Y direction (refer to 5'). This makes the construction of belt transfer complex, so that its accuracy control becomes difficult. In addition, when the belt transfer moves in the Z direction, its operation speed cannot be increased, and there is the danger of falling.

In the tire building apparatus shown in FIG. 12, a band drum 1, a shaping drum 2, and a band transfer 4 are arranged in the same manner as with the tire building machine shown in FIG. 11. However, a belt forming machine 101 is arranged in parallel to the shaping drum 2 on the side opposite to the operator (rear position).

Therefore, the belt transfer 5 need not be moved in the Z direction, but must be moved in the X-Y direction (refer to 5'). This makes the construction of belt transfer complex, so that its accuracy control becomes difficult. In addition, if any trouble occurs on the belt drum, it is dangerous and difficult for the operator to obtain access to the belt forming machine 101.

In the tire building apparatus shown in FIG. 13, a band drum 1 and a belt forming machine 101 are arranged on the same axis, and a shaping drum 2 is arranged in parallel to the aforesaid axis on the side opposite to the operator (rear position).

Therefore, a band transfer 4 and a belt transfer 5 need not be moved in the Z direction, but must be moved in the X-Y direction (refer to 4' and 5'). Moreover, because the movement range of them overlaps, the band transfer 4 is moved on an X-Y table disposed on the floor and, on the other hand, the belt transfer 5 must be moved while being hung down from an X-Y table disposed on the ceiling. It has another problem that this makes the construction of belt transfer complex, so that its accuracy control becomes difficult.

DISCLOSURE OF THE INVENTION

The present invention was made to solve the above problems. Accordingly, an object of the present invention is to provide a tire building apparatus in which its construction can be simplified, its accuracy control can be performed easily, its work efficiency can be improved, and its layout can be made efficiently.

To achieve the above object, the present invention is constituted as described in the following items (1) and (2).

(1) In a tire building apparatus comprising a band drum, a shaping drum, and a belt forming machine having two belt drums which can be oscillated or cyclically moved, the tire building apparatus is characterized in that the band drum and the belt forming machine are disposed on the same axis in opposing relationship, the shaping drum is disposed so that it can be reciprocated between the position on the aforesaid axis and the standby position while maintaining the parallel condition with respect to the aforesaid axis, and a band transfer and a belt transfer are disposed so that they can be reciprocated along the aforesaid axis between the band drum and the belt forming machine.

(2) The aforesaid shaping drum in item (1) is characterized by including a tire unloading means and a means for stitching by using stitch wheels, and being disposed so as to be moved, by a driving means, on a base disposed substantially at right angles to the aforesaid axis.

Since the present invention is constituted as described above, it provides the following operations.

The tire building apparatus of the present invention comprises a band drum, a shaping drum, and a belt forming machine having two belt drums which can be oscillated or cyclically moved, in which the band drum and the belt forming machine are disposed on the same axis in opposing relationship, the shaping drum is disposed so that it can be reciprocated between the position on the aforesaid axis and the standby position at the rear while maintaining the parallel condition with respect to the aforesaid axis, and a band transfer and a belt transfer are disposed so that they can be reciprocated along the aforesaid axis between the band drum and the belt forming machine. Therefore, a tire can be built by the operation of the band transfer, the belt transfer, and the shaping drum in a horizontal plane in the uniaxial direction. This simplifies the construction of tire building apparatus, and facilitates the control of accuracy. Also, two tire building apparatuses can be arranged in opposing relationship. This enables one operator to easily handle two tire building apparatuses, by which the work efficiency is improved, and enables the layout of a plurality of tire building apparatuses to be made efficiently.

As described above, the present invention offers effects that a tire can be built by the operation of the band transfer, the belt transfer, and the shaping drum in a horizontal plane in the uniaxial direction, which simplifies the construction of tire building apparatus, and facilitates the control of accuracy.

Also, two tire building apparatuses can be arranged in opposing relationship, which enables one operator to easily handle two tire building apparatuses, thereby the work efficiency being improved, and enables the layout of a plurality of tire building apparatuses to be made efficiently.

BRIEF DESCRIPTION OF THE DRAWINGS

FIG. 6 is a chart showing the sequence of operation of the tire building apparatus;

FIG. 7 is a chart showing the sequence of operation of the tire building apparatus;

FIG. 10(a) through 10(d) are views illustrating an example of belt forming machine and servicer of a conventional tire building apparatus;

BEST MODE FOR CARRYING OUT THE INVENTION

One embodiment of the tire building apparatus in accordance with the present invention will be described below with reference to FIGS. 1 through 5.

Figure 1:
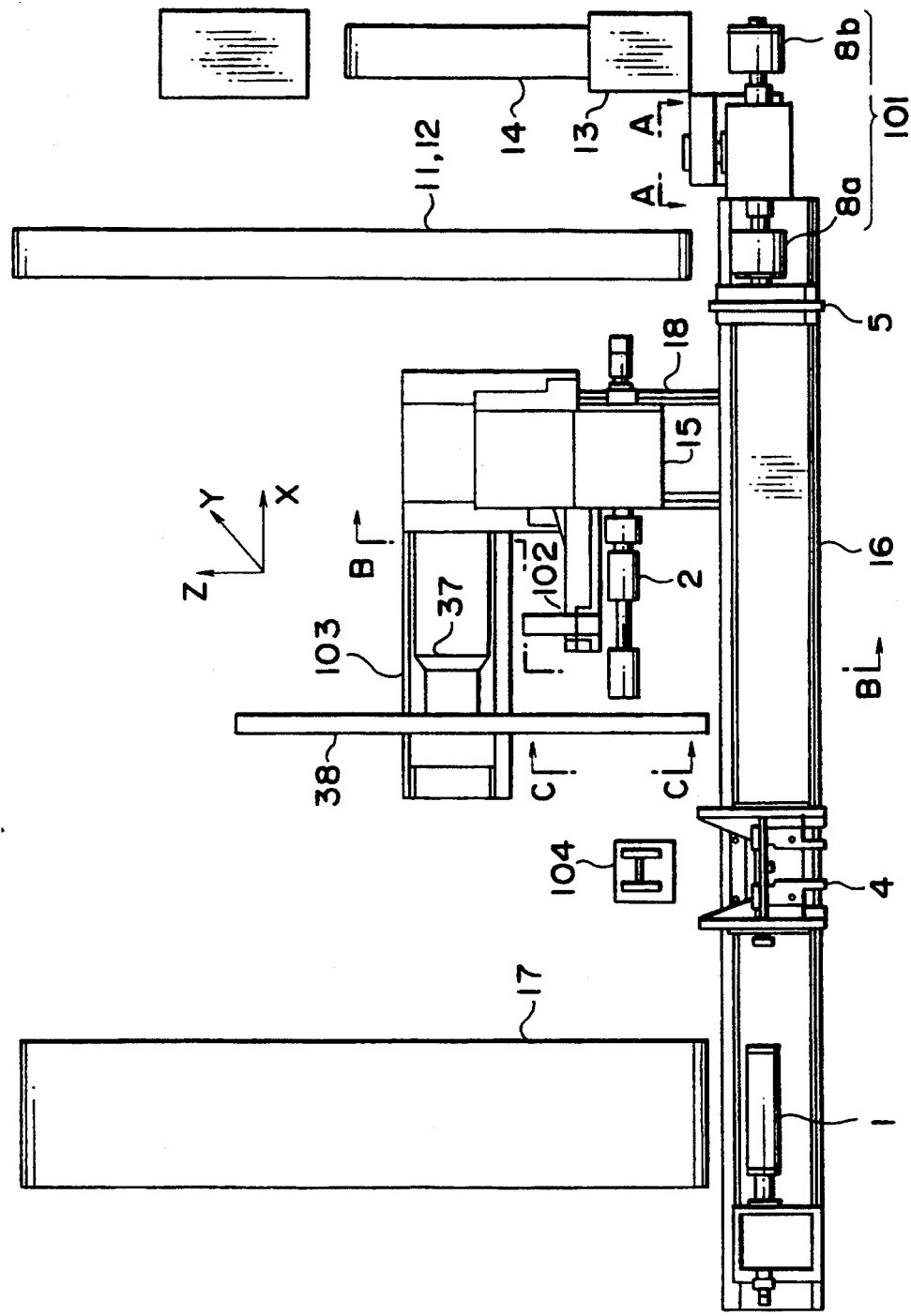
FIG. 1 is a plan view showing one embodiment of a tire building apparatus in accordance with the present invention.

As shown in FIG. 1, a band drum 1 and a belt forming machine 101 are arranged on the same axis in opposing relationship. A shaping drum 2 is arranged so that it can be reciprocated between the aforesaid axis and the side opposite to the operator (rear standby position) in parallel to the aforesaid axis. A band transfer 4 and a belt transfer 5 are arranged so that they can be reciprocated between the band drum 1 and the belt forming machine 101 along the aforesaid axis. Reference numeral 16 denotes a common center base. The band transfer 4 and the belt transfer 5 slide on the center base 16.

On the side opposite to the operator (rear position) with respect to the band drum 1, a band servicer 17 is arranged. On the side opposite to the operator (rear position) with respect to a belt drum 8a of the belt forming machine 101, No. 1 belt servicer 11 and No. 2 belt servicer 12 are arranged. On the side opposite to the operator (rear position) with respect to a belt drum 8b, a jointless servicer 13 and a tread servicer 14 are arranged.

Under the shaping drum 2, a stitcher device 102 is arranged, and at the rear of the shaping drum 2, a tire unloading device 103 and a bead supplying device 104 are arranged.

Figure 2:
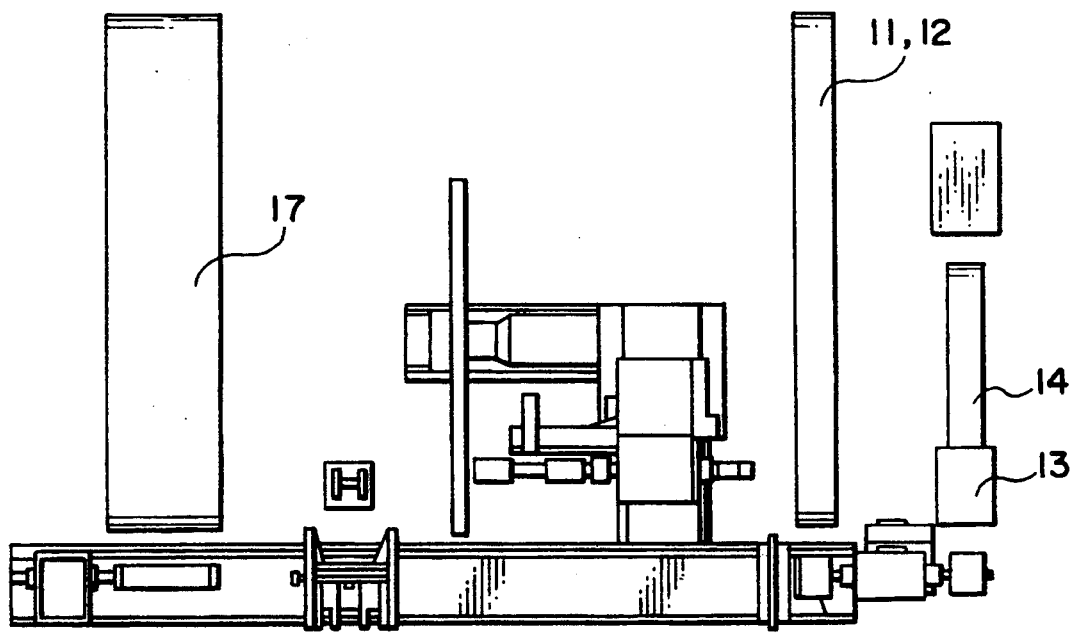
FIG. 2 is a plan view in the case where two tire building apparatuses are arranged in opposing relationship.
Figure 2:
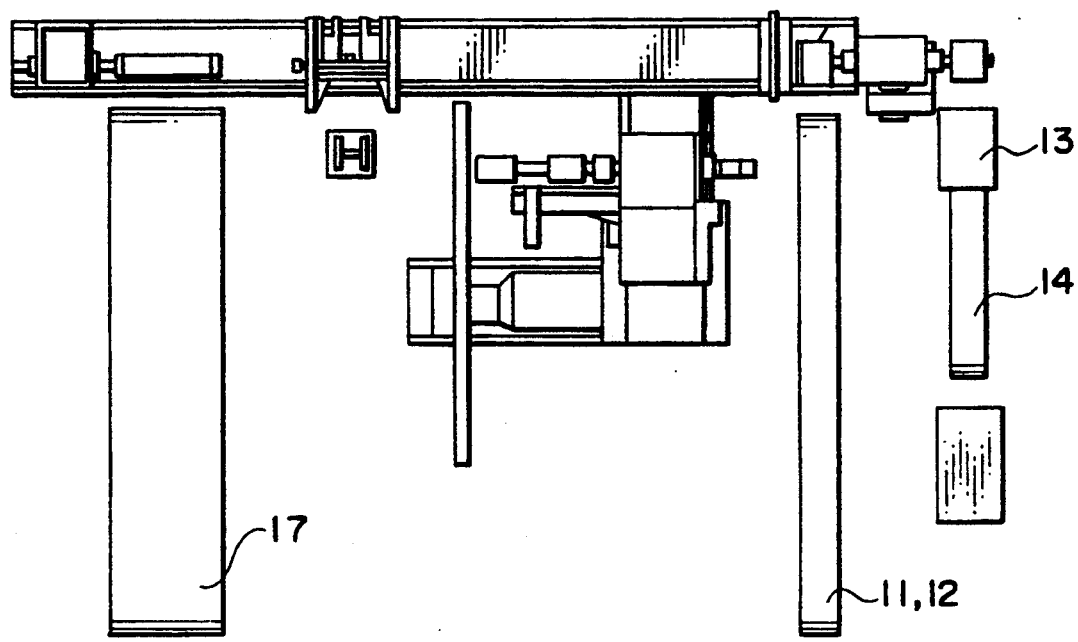

FIG. 2 shows a condition in which two tire building apparatuses shown in FIG. 1 are arranged in opposing relationship.

For the servicers described above, publicly known ones can be used; therefore, the explanation of their details is omitted. For the band drum 1, the shaping drum 2, the band transfer 5, and the belt drums 8a and 8b, those of the tire building apparatuses shown in FIGS. 10 through 13 can be used; therefore, the explanation of their details is omitted.

Figure 3B:
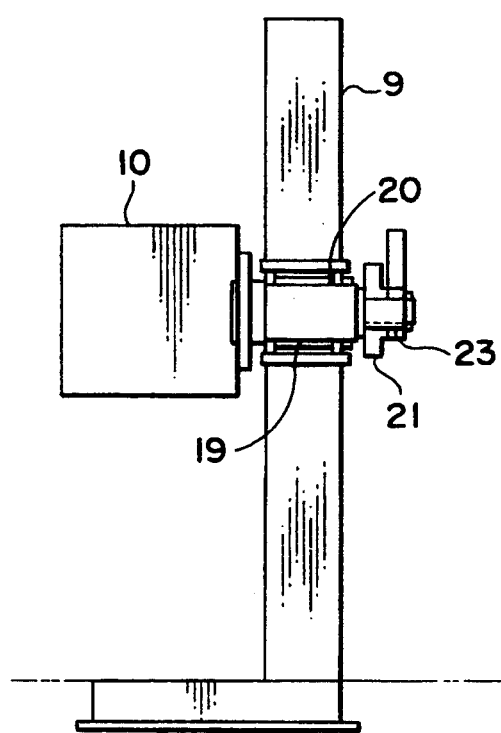
FIG. 3(b) is a side view of FIG. 3(a)
Figure 3A:
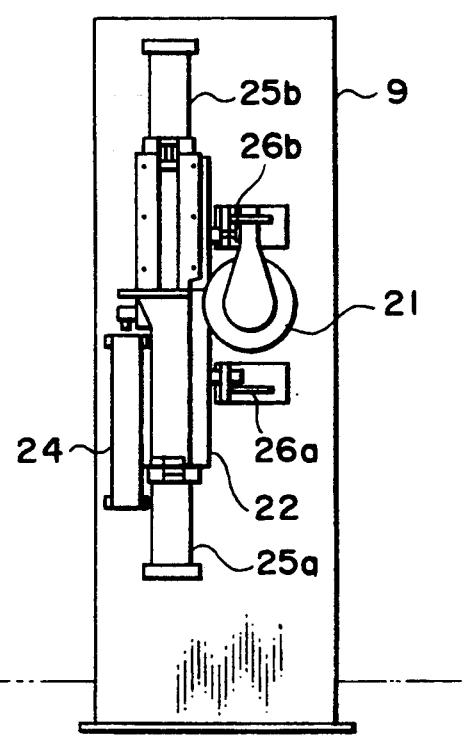
FIG. 3(a) is a rear view along the line A—A of FIG. 1.

FIGS. 3(a) and 3(b) show a portion along the line A—A of FIG. 1, that is, an oscillation mechanism of the belt forming machine 101.

Reference numeral 10 denotes a housing. One end of the housing 10 is attached to a shaft 19, which is rotatably supported by a stand 9 via a bearing 20. A pinion 21 is fixed to the other end of the shaft 19 via a key 23. A rack 22 engages with the pinion 21.

The rack 22 is reciprocated by an air cylinder 24. When the air cylinder 24 is operated in the extension/retraction direction, this movement is transmitted to the pinion 21 via the rack 22, rotating the pinion 21 and the shaft 19. Thus, the housing 10 turns with the shaft 19 being the center, by which the belt drums 8a and 8b oscillate. At each oscillation stop position, the shock in stopping is absorbed by shock absorbers 25a and 25b, so that the belt drums are stopped at the accurate positions by stoppers 26a and 26b.

Figure 4:
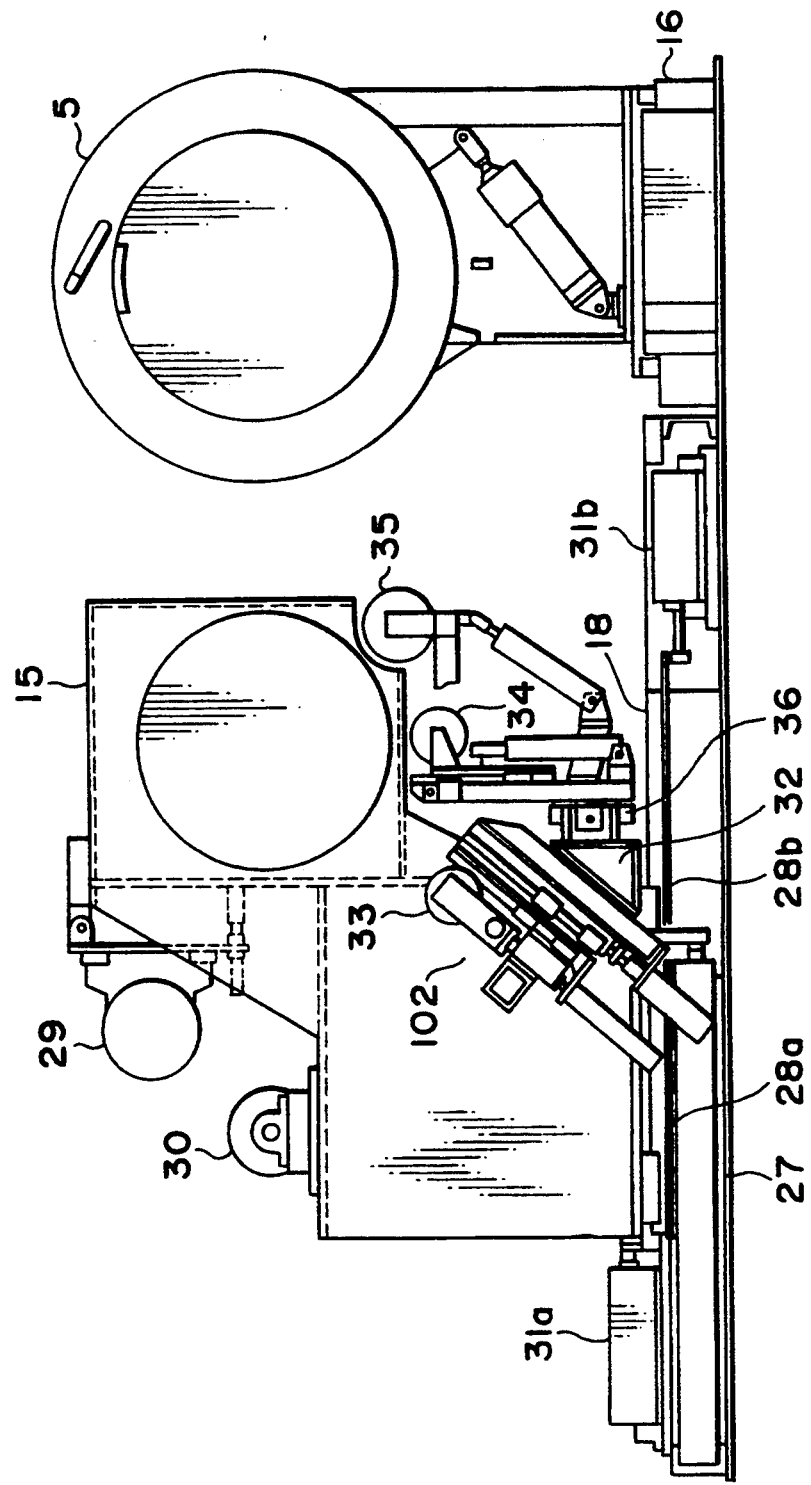
FIG. 4 is a side view along the line B—B of FIG. 1.

FIG. 4 shows the portion along the line B—B of FIG. 1, that is, the housing 15 of the shaping drum 2 and the stitcher device 102, and the belt transfer 5 and the center base 16.

The housing 15 of the shaping drum 2 is operated by an air cylinder 27 (or another electric driving unit), so that it reciprocates on a housing base 18 between the standby position (position shown in the figure) and the central axis position of the belt transfer 5. The housing 15 is of an overhang type supported by linear bearings 28a and 28b at the rear to avoid the interference with the center base 16.

The housing 15 is provided with a motor 29 for opening/closing the shaping drum 2 and a motor 30 for rotating the shaping drum 2. At the aforesaid two stop positions of the housing 15, the shock in stopping is absorbed by shock absorbers 31a and 31b, so that the housing 15 is stopped at the accurate positions by stoppers (not shown).

The stitcher device 102, which corresponds to a publicly known static stitch system, comprises a central stitch wheel 33, an intermediate stitch wheel 34, and an outer stitch wheel 35. Each wheel is given stitch force by an air cylinder.

The stitcher device 102 is installed to a frame 32 fixed to the housing 15. It receives a belt and tread assembly at the central position of the belt transfer 5, and can perform stitching operation even during the time when it moves to the standby position.

The central stitch wheel 33 and its driving unit are fixed to the frame 32 of the housing 15, and located at the center of the shaping drum 2. The intermediate stitch wheel 34 and the outer stitch wheel 35 are mounted on rails 36 installed on the frame 32 of the housing 15 in parallel to the axis of the shaping drum 2, and driven by a not illustrated driving unit. These wheels retract to the lower part of the housing 15 to avoid the interference with the belt transfer 5 when a belt and tread assembly is received at the central position of the belt transfer 5.

Figure 5:
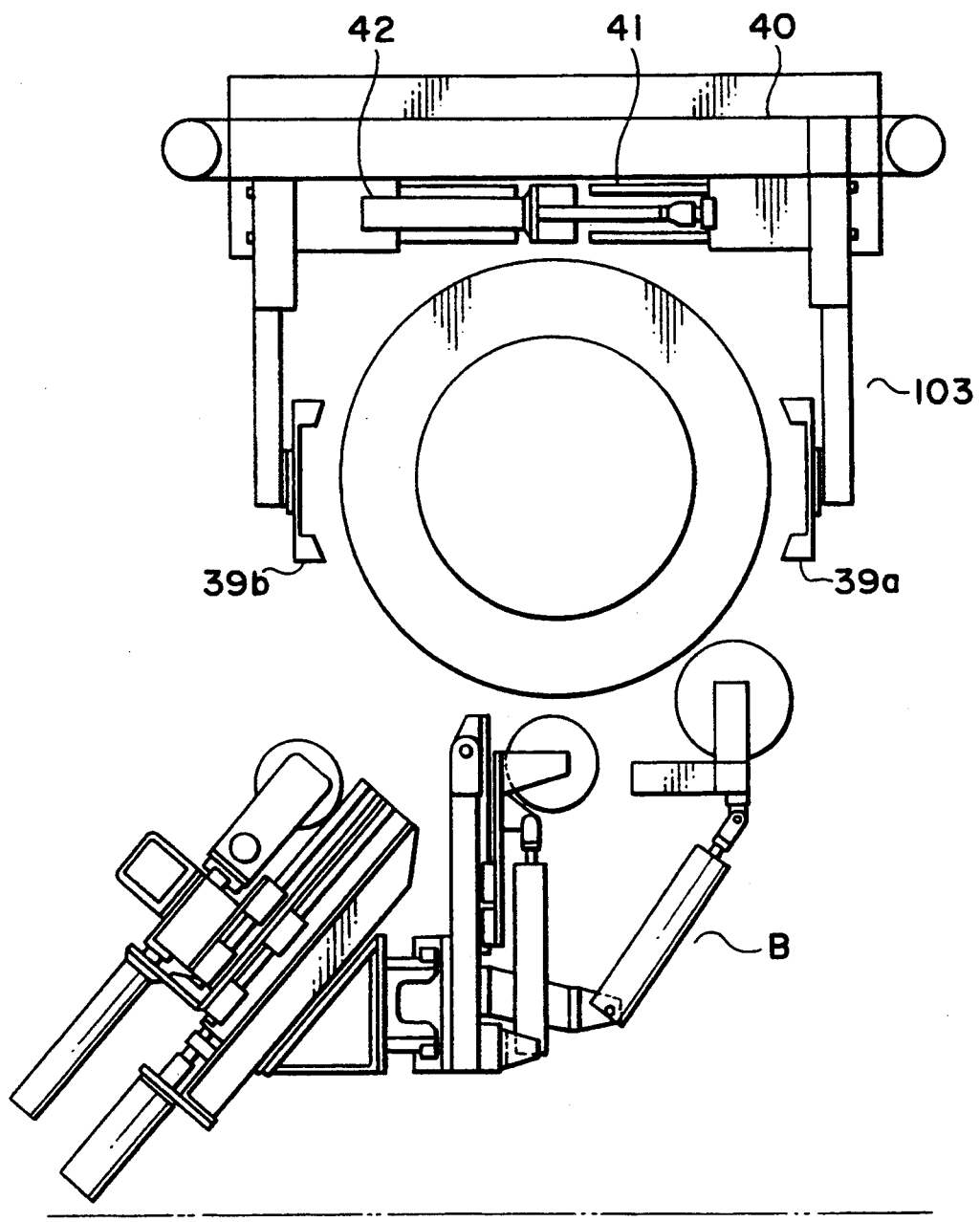
FIG. 5 is a side view along the line C—C of FIG. 1.

FIG. 5 shows the portion along the line C—C of FIG. 1, that is, the tire holding portion of the tire unloading device 103.

The tire holding portion, which is mounted on a Y-direction rail 38 installed on a mount (a mount moving in the X direction) 37 shown in FIG. 1, can be moved in the X-Y direction. Reference numerals 39a and 39b denote tire holders. The tire holder 39a is installed at the upper part of a chain 40, while the tire holder 39b at the lower part thereof. They are mounted on rails 41 so that they can move symmetrically with each other. The tire holders 39a and 39b are moved in the approaching direction by operating an air cylinder 41 to grasp a tire, while a tire is released by moving the tire holders 39a and 39b in the separating direction.

The tire holding portion is located at the position where it does not interfere with the stitcher device 102 because it waits at the position where it grasps a tire while a tire is being stitched up.

Next, the operation of the tire building apparatus shown in FIGS. 1 through 5 will be described concretely.

(a) Preparation of bead and band

In the preparation of bead and band, a bead is held by the band transfer 4. This operation is similar to that described in the official gazzette of Japanese Patent Provisional Publication No. 2-107432 or No. 107432/1990; therefore, the explanation is omitted.

(b) Preparation of belt and tread assembly

The chart for the preparatory operation of belt and tread assembly is shown in FIG. 6. Position A in FIG. 6 indicates the operations along the line A—A of FIG. 1, while position B indicates those along the line B—B of FIG. 1. FIG. 6 shows an example of the preparatory operation. The preparatory operation time depends on the arrangement of servicers which is determined from the material supply condition at the factory, the distribution of time for winding each material, and particularly the length of time for winding a jointless. FIG. 7 shows the preparatory operation in the case where the time taken for winding a jointless is long.

(c) From band insertion to tire unloading

Figure 8I:
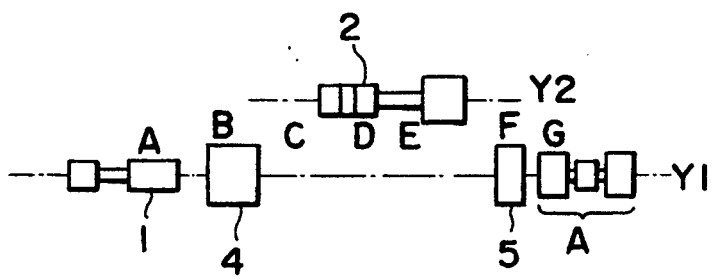
FIG. 8 is a view illustrating the operation of the tire building apparatus.
Figure 8:
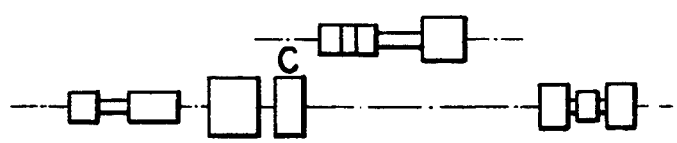
Figure 8:
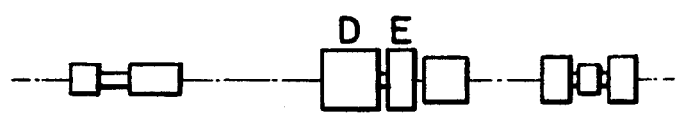
Figure 8V:
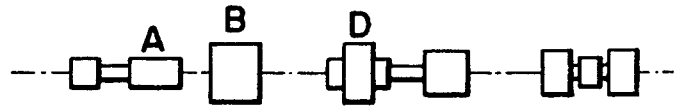
Figure 8:
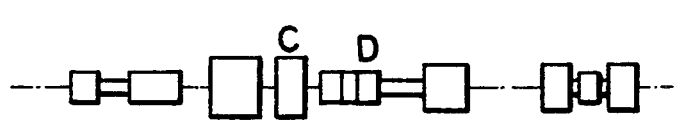
Figure 9:
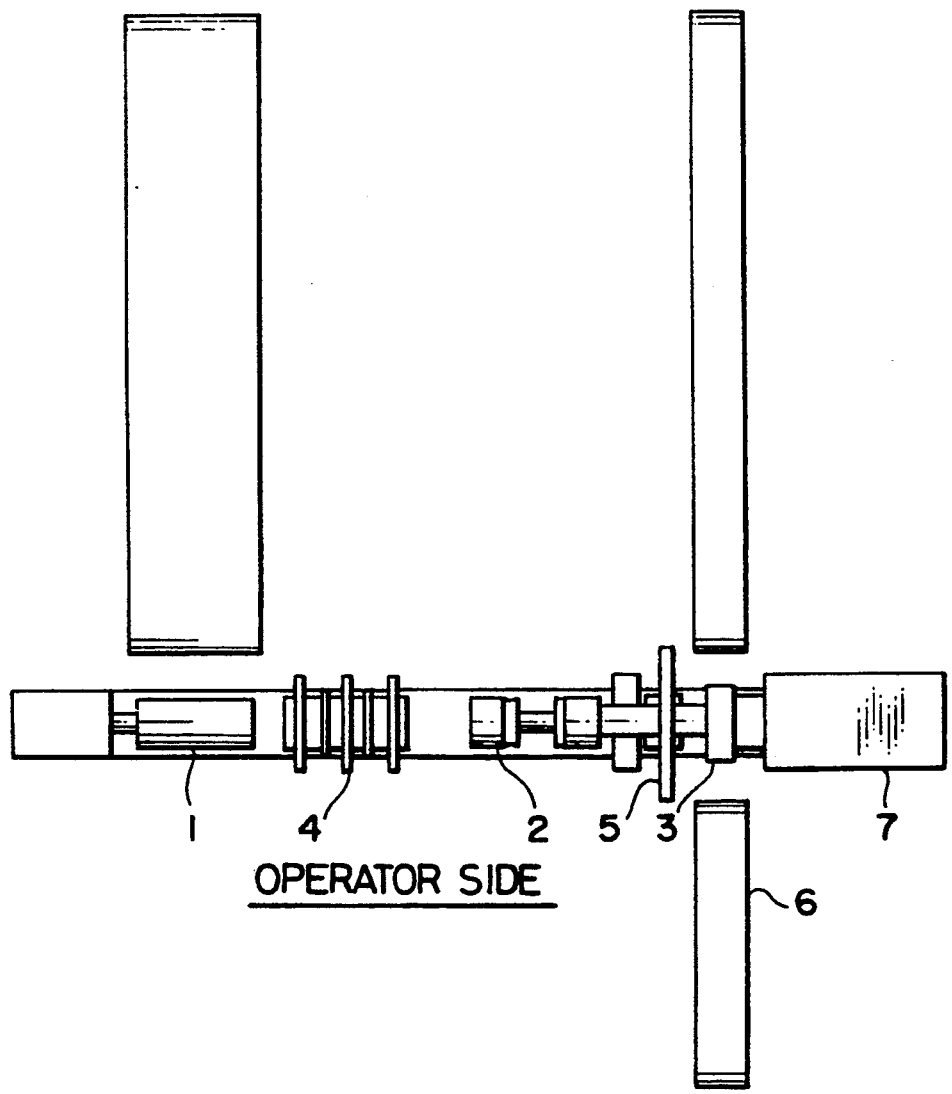
FIG. 9 is a plan view showing an example of conventional tire building apparatus.
Figure 11:
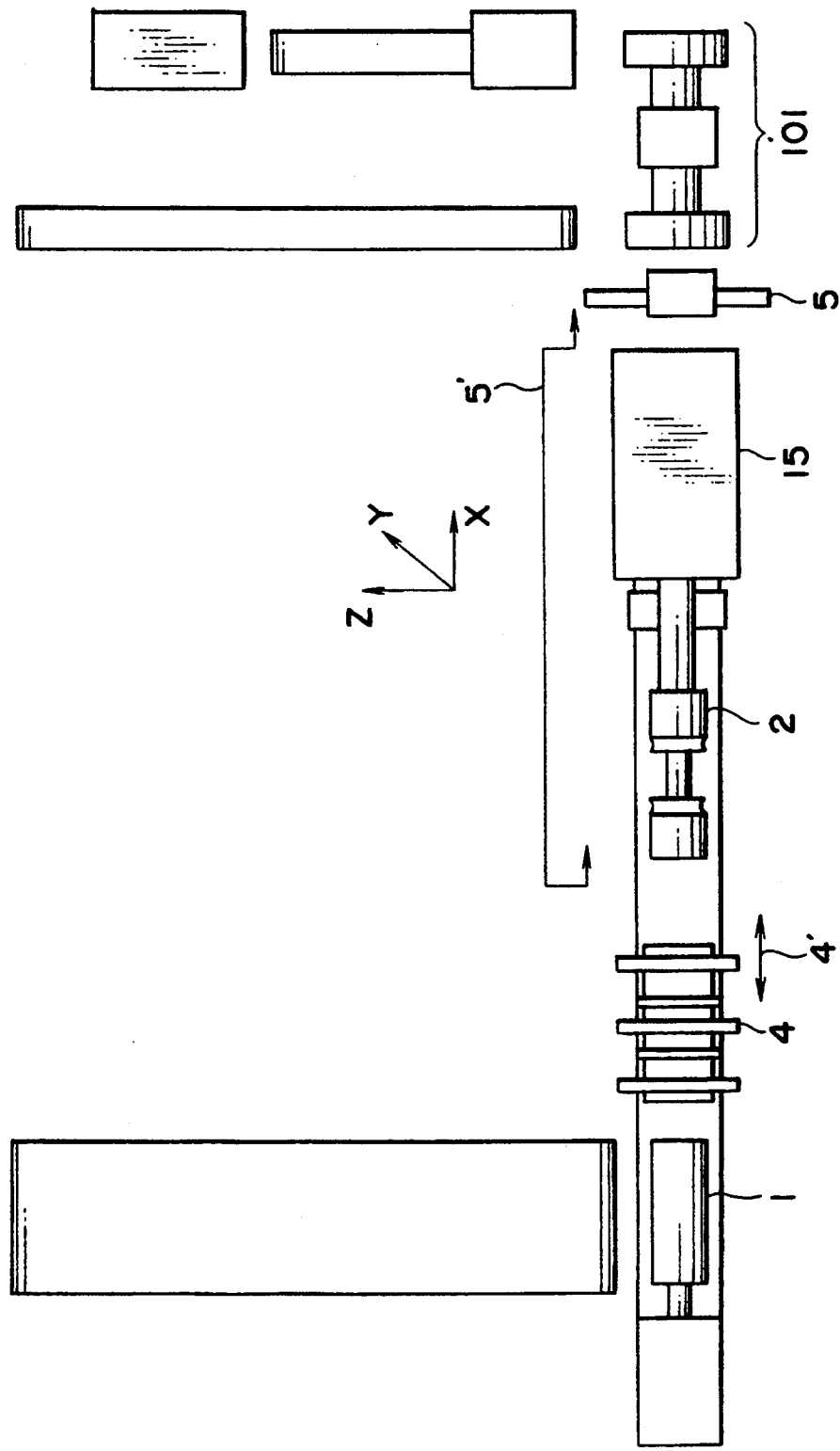
FIG. 11 is a plan view showing another example of conventional tire building apparatus.
Figure 12:
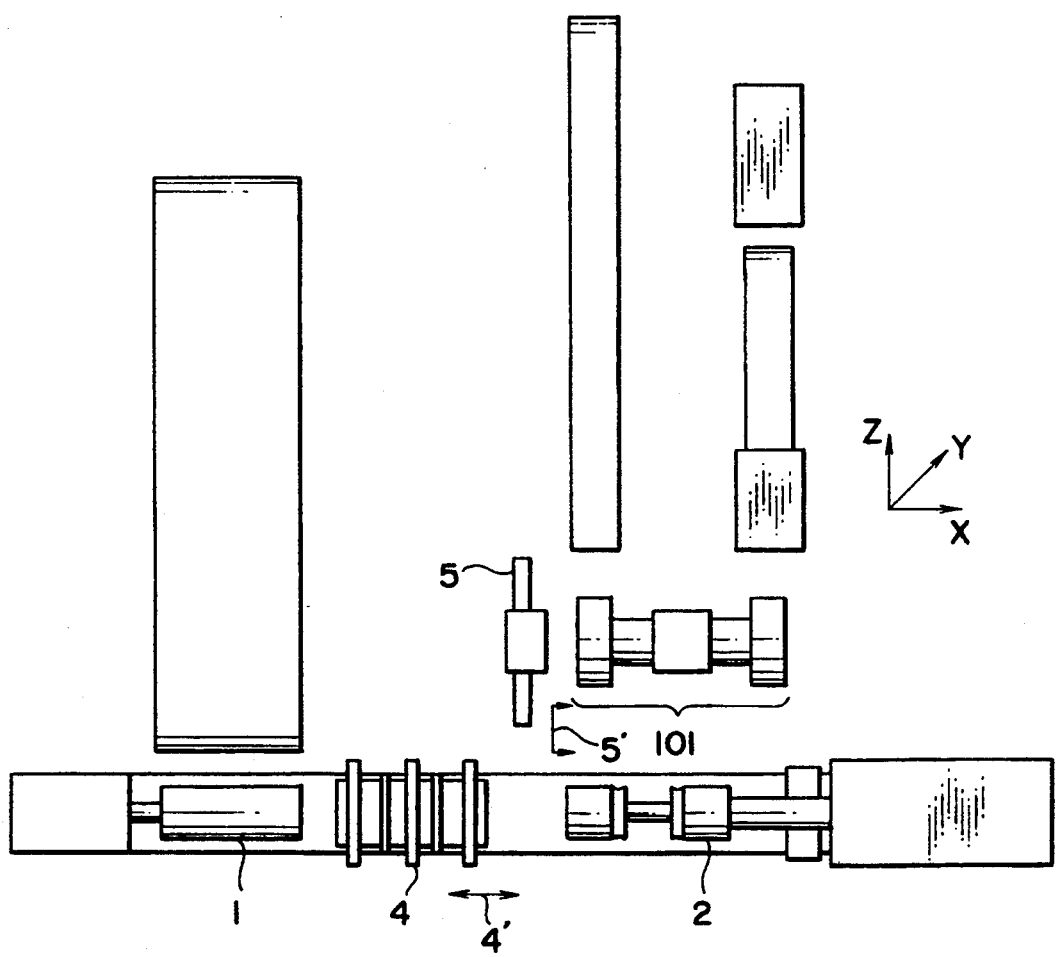
FIG. 12 is a plan view showing another example of conventional tire building apparatus.
Figure 13:
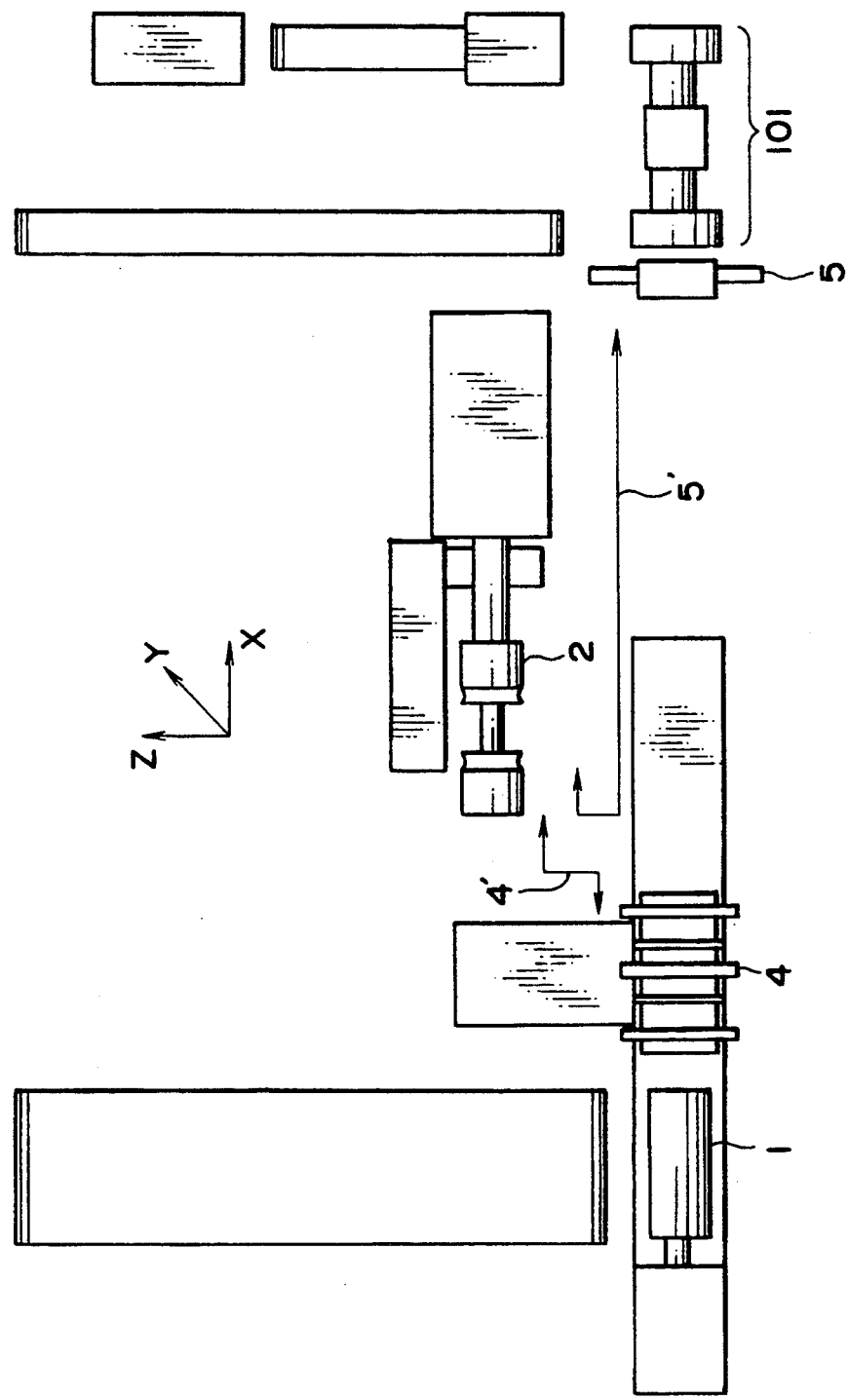
FIG. 13 is a plan view showing still another example of conventional tire building apparatus.

FIGS. 8(i) through 8(vi) show a series of operations from band insertion to tire unloading.
  (i) On the shaping drum 2, stitching and tire unloading are performed. On the band transfer 4, a band and a bead are held. On the belt transfer 5, a belt and tread assembly is held.
  (ii) The belt transfer 5 moves to position C.
  (iii) The shaping drum 2 advances to the axis position Y1 connecting the band drum 1 to the belt forming machine 101.
  (iv) The band transfer 4 moves to position D, which is the center of the shaping drum 2, and the belt transfer 5 moves to position E, so that a band and a bead are set to the shaping drum 2.
  (v) The band transfer 4 moves to position B to receive a bead from the bead supplying device 104. Further, the band transfer 4 moves to position A, which is the center of the band drum 1, to remove the finished band. On the shaping drum 2, the belt transfer 5 moves to position D, where shaping is performed, and the belt and tread assembly is bonded to a carcass.
  (vi) The empty belt transfer 5 moves to position C, and at the same time the stitcher device 102 moves to position D, stitching being started.
  (vii) The shaping drum 2 moves to the standby position Y2 while successively performing stitching and side wall turn-up. The belt transfer 5 moves to position F, and further moves to position G, which is the center of the belt drum 1, to remove the finished belt and tread assembly. During this time, on the shaping drum 2, side wall turn-up is finished, and the tire is unloaded by the tire unloading device 103.

The above steps are those corresponding to the side wall over tread construction. With the tread over side wall construction, in step (v), shaping and side wall turn-up are first performed on the shaping drum 2, and then the belt transfer 5 moves to position D, where the belt and tread assembly is bonded to a carcass.

Also, in step (vi), the belt transfer 5 moves to position C, and at the same time the stitcher device 102 moves to position D, stitching being started.

Further, in step (vii), the shaping drum 2 moves to the standby position Y2 while performing stitching, and the tire is unloaded by the tire unloading device 103.

Industrial Applicability

As described above, the tire building apparatus in accordance with the present invention is useful in the industry because its construction can be simplified and the control of building accuracy can be facilitated.

Further, the work efficiency can be improved, and the layout of the system can be made efficiently.

We claim:

1. A tire building apparatus comprising a band drum, a shaping drum, and a belt forming machine having two belt drums which can be oscillated to exchange drum positions, wherein said band drum and said two belt drums of said belt forming machine are disposed on the same axis in opposing relationship, said shaping drum is disposed so that it can be reciprocated between a position on said axis between said band drum and said belt forming machine and a standby position while maintaining a parallel condition with respect to said axis, and a band transfer and a belt transfer are disposed so that they can be reciprocated along said axis between said band drum and said belt forming machine.

2. A tire building apparatus according to claim 1 wherein said shaping drum includes a tire unloading means and a means for stitching by using stitch wheels, and is disposed so as to be moved, by a driving means, on a base disposed substantially at right angles to said axis.

* * * * *